Figure 1:
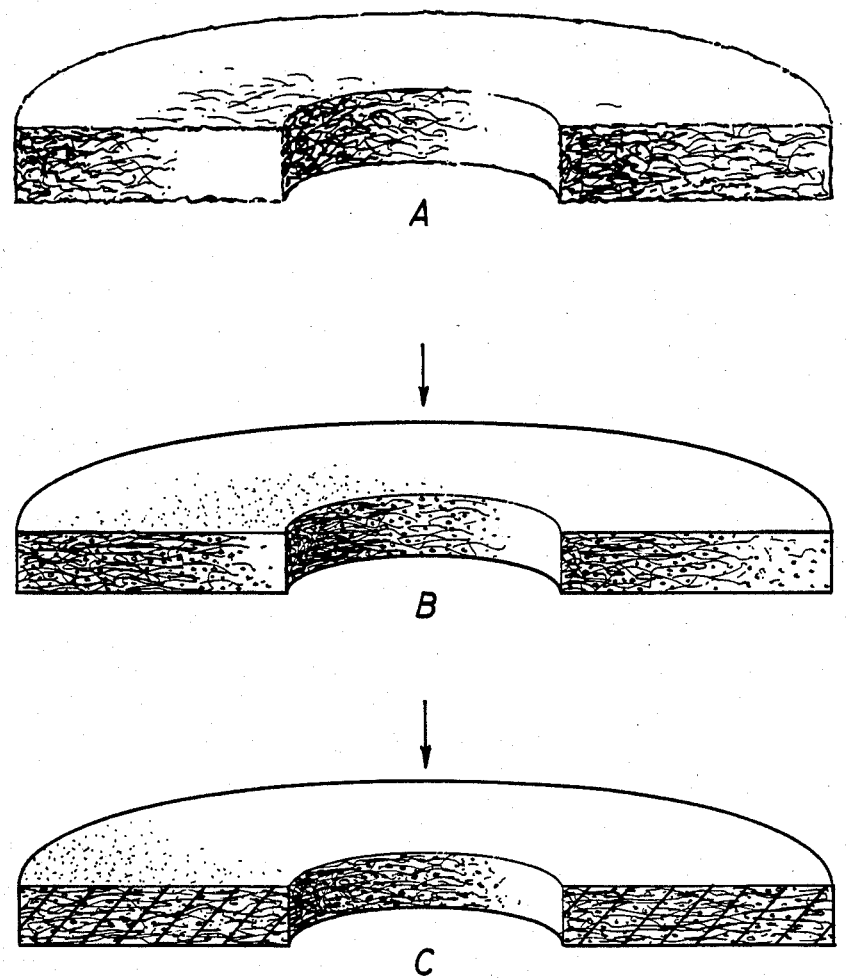

United States Patent [19]

Harding et al.

[11] Patent Number: 4,663,368

[45] Date of Patent: * May 5, 1987

[54] FRICTION MATERIALS AND THEIR MANUFACTURE

[75] Inventors: John D. Harding, Chapel en le Frith; Keith D. Dolbear, Chelmorton, both of England

[73] Assignee: Turner & Newall PLC, Manchester, England

[*] Notice: The portion of the term of this patent subsequent to Apr. 7, 2004 has been disclaimed.

[21] Appl. No.: 708,053

[22] Filed: Mar. 4, 1985

[30] Foreign Application Priority Data

Mar. 3, 1984 [GB] United Kingdom ............... 8405645

[51] Int. Cl.⁴ ................. C08J 5/14; C08K 7/02; C08L 61/06; F16D 69/00
[52] U.S. Cl. ................. 523/155; 192/107 M; 523/152; 523/156; 525/58; 525/142; 525/144; 525/429
[58] Field of Search ............... 428/297; 523/155, 156, 523/152, 153; 192/107 M; 525/429, 502, 134, 142, 144, 58

[56] References Cited

U.S. PATENT DOCUMENTS

| | | | |
|---|---|---|---|
| 2,553,215 | 5/1951 | Schultz | 523/156 |
| 4,118,528 | 10/1978 | Lowry | 192/107 M |
| 4,150,011 | 4/1979 | Searfoss et al. | 523/153 |
| 4,349,595 | 9/1982 | Trainer et al. | 192/107 M |
| 4,374,059 | 2/1983 | Wagner | 523/155 |
| 4,374,211 | 2/1983 | Gallagher et al. | 523/156 |
| 4,386,168 | 5/1983 | Fujimaki et al. | 523/155 |
| 4,403,047 | 9/1983 | Albertson | 523/155 |
| 4,465,796 | 8/1984 | Leroy et al. | 523/155 |
| 4,476,256 | 10/1984 | Hamermesh | 523/155 |
| 4,477,605 | 10/1984 | Okubo et al. | 523/155 |
| 4,508,855 | 4/1985 | Peters | 523/156 |

FOREIGN PATENT DOCUMENTS

| | | |
|---|---|---|
| 2259867 | 12/1968 | Australia . |
| 0034258 | 8/1981 | European Pat. Off. . |
| 0100233 | 2/1984 | European Pat. Off. . |
| 0147508 | 7/1985 | European Pat. Off. . |
| 7818079 | 1/1979 | France . |
| 7901174 | 8/1980 | France . |
| 1008801 | 11/1965 | United Kingdom . |
| 2000793 | 1/1979 | United Kingdom . |
| 1604839 | 12/1981 | United Kingdom . |
| 1604828 | 12/1981 | United Kingdom . |

*Primary Examiner*—Allan M. Lieberman
*Attorney, Agent, or Firm*—Nixon & Vanderhye

[57] ABSTRACT

A non-asbestos clutch facing has an actual density such that the facing is permeable to air. The clutch facing is preferably a moulded facing containing short reinforcing fibres and having an actual density not greater than 90% of theoretical.

The facing may be made by a technique in which a pre-form is prepared, moulded to the desired density and then cured under a pressure such as not to cause substantial further density change.

11 Claims, 2 Drawing Figures

FRICTION MATERIALS AND THEIR MANUFACTURE

This invention relates to friction materials and their manufacture, and more particularly to clutch facings for dry running.

It should be noted that clutch facings for dry running are referred to above to distinguish them from clutch facings for so called "wet transmissions" in which the clutch facings run "wet", ie in a liquid such as transmission oil, and are made porous in order to take up such liquid.

Clutch facings for dry running may be manufactured by subjecting an annular shaped preform containing a binder, reinforcing fibres, fillers and friction modifiers to the action of heat and pressure in a suitably shaped die. The binder, normally a thermosetting resin or vulcanisable elastomer or mixtures thereof, softens and flows to contact the reinforcing fibers and particles of filler or friction modifier then hardens under the continued application of heat and pressure. Clutch facings made by this method are usually called "moulded facings".

Alternatively the preform may consist of a yarn or tape impregnated with a mixture of binders, fillers and friction modifiers and wound in a spiral or undulating pattern to produce an annular shape. Clutch facings made from such preforms are usually known as "wound facings". The facings in either case are usually die cured for periods of typically 4 minutes to 15 minutes and then may be further heated at temperatures of 150° C.-250° C. to complete the cure of the binder and also to improve friction properties.

Conventional friction materials moulded from a mixture of asbestos fibres, thermosetting resins or vulcanisable elastomers or mixtures thereof and particulate fillers and friction modifiers are not normally consolidated to achieve the theoretical densities of the mixtures, ie they contain proportions of voids, even when cured at temperatures of up to 160° C. and pressures of up to 3 tons per square inch. The presence of voids, especially when interconnected to produce a permeable structure, is desirable to produce materials with good resistance to "fade" ie reduction in coefficient of friction when friction materials operate at high temperatures. Moulded clutch facings comprising asbestos, phenol-formaldehyde resin binder, particulate fillers and friction modifiers are manufactured with densities typically in the range of 85-95% of theoretical density corresponding to void volumes of 15-5%.

When replacing asbestos fibres by fibres such as cellulose, glass, mineral wools (eg basalt or slagwools), alumino-silicate, polyacrylo-nitrile, polyamides, aromatic polyamides and carbon fibres we have found that conventionally press cured materials are consolidated by greater percentages of their theoretical densities than are asbestos based materials resulting in impermeable structures with very low void volumes. Such non-asbestos friction materials may possess good physical strengths but have poor resistance to fade and wear. Some improvement in fade resistance may be made by moulding or machining grooves into the working face of the friction material but such improvements are not sufficient to match the performance of the best asbestos based friction materials.

We have found that a method of manufacturing non-asbestos friction materials with high permeability with all its attendant advantages.

Thus the present invention provides a non-asbestos clutch facing comprising reinforcing fibres embedded in a matrix of binder material, in which the actual density of the facing is such that the facing is permeable to air under a pressure differential of 1 atmosphere, and the amount of reinforcing fibres in the facing is between 4 and 60 percent by weight of the facing.

The invention also provides a method for the manufacture of a non-asbestos clutch facing which comprises mixing reinforcing fibres and curable binder material and, optionally, friction and wear modifiers, forming a preform comprising said mixture in the rough shape of a clutch facing heating and pressing said preform to compress it, without completely curing the binder material, and consolidate the preform to an actual density more where the facing product is permeable to air and completing cure of the binder by heating under conditions of pressure such as to not cause any substantial further change in actual density.

The non-asbestos clutch facings according to the invention incorporate reinforcing fibres which may be inorganic or organic or mixtures of fibres in which both types are present. Typically the clutch facings may include fibres of glass, mineral wool, alumino-silicate, metals such as steel, cellulose, polyamides, particularly aromatic polyamides such as those available from DuPont under the trade mark KEVLAR, polyacrylonitrile, polyvinyl alcohol and so on. Preferably the fibres used are in the form of staple fibres and although the length of fibres used is not critical it would generally be in the range 1-10 mm for most purposes.

If desired, however, the fibres may be used in the form of yarns, in such cases the fibres and binder being mixed by impregnating yarns with binder cement which may include also fillers and friction and wear modifiers. Mixtures of fibres may be particularly useful in providing a desired combination of properties and preferred mixtures include glass or another mineral fibre such as alumino-silicate or a processed mineral wool with an organic fibre such as cellulose, aromatic polyamide or polyacrylonitrile, and mixture of organic fibres such as aromatic polyamide with polyacrylonitrile.

The amount of reinforcing fibres in the facings is preferably in the range 10 to 50 percent by weight.

The binder material mentioned previously is preferably based on binder polymers usual for use in clutch facings such as resins based on phenol and formaldehyde and related resins, and rubbers such as nitrile rubber, natural rubber and styrene-butadiene rubber. Mixtures of resin and rubber may be used, the particular combination of polymers chosen depending upon the manufacturing characteristics desired and properties in the finished facing. The amount of binder polymers employed will generally be in the range 10 to 35 percent by weight of the facing.

Friction and wear modifiers and fillers of the usual types may be employed, examples of such materials being carbon black, graphite, talc friction dust and metal powders eg brass, copper, metallic sulphides.

The actual density of the facings indicates that they have a substantial void content and in the facings of this invention the voids are, at least to some extent, interconnected so that the facings have a degree of permeability of air. In a moulded clutch facing using staple fibre the actual density of the facings is preferably not greater than 90 percent and preferably also not less than 72 percent of the theoretical density. In the case of a wound clutch facing using yarns, the actual density of the facing may need to be lower than that of a moulded facing to have equivalent permeability.

The method of making the clutch facings of this invention is characterized by the feature that the facing is pressed to approximately its final density under conditions in which the binder polymers remain substantially uncured. The method will now be more particularly described, by way of example only, with reference to the accompanying drawings of which FIG. 1 is a schematic diagram showing the cross section of a clutch facing at three stages in manufacture and FIG. 2 is a flow diagram of the process employed.

A preform of the desired shape as indicated in FIG. 1A is made from a mixture of non-asbestos fibre or fibres, thermosetting resin binder and particulate friction modifiers and fillers by any convenient method eg by dispersing the components in water to form a slurry, dispensing the slurry into a suitably shaped die then removing most of the water by the application of pressure to form a preform which is then dried to remove the residual water. Elastomers, particularly in the form of latices, may also be included to improve preform strength, modify friction and wear characteristics and to reduce stiffness of the binder system. The dried preform is heated to a temperature above the melting or softening point of the binder resin by a suitable means such as conduction from a heated metal plate or by electromagnetic radiation and is then pressed in a fully enclosed die for a short period to consolidate the preform (without cure taking place) to the desired proportion of its theoretical density as indicated in FIG. 1B. The still warm consolidated preform is ejected from the die and allowed to cool under a weight to prevent distortion. The consolidated preforms may be coated with a release agent such as talc or may be separated by suitable non stick separators, then clamped between formers and heated at elevated temperatures, usually in the range of 150° C. to 250° C., to complete the cure of the binder and also to improve the frictional properties of the finished friction material shown in FIG. 1C. A minimum period of baking, dependent on the temperature employed, is essential to cure the binder to a comparable degree to that achieved by conventional press curing methods with cure times of typically 5–10 minutes at a temperature of 150° C.–160° C. If this minimum baking period were not used, the friction material would have poor high temperature strength and would soften if operated at elevated temperatures.

In the consolidation step, which involves pressing an annular shaped preform in a fully enclosed annular shaped die, the die may be fitted with plain or ribbed forces to produce ungrooved or grooved facings as desired.

Figure 2:
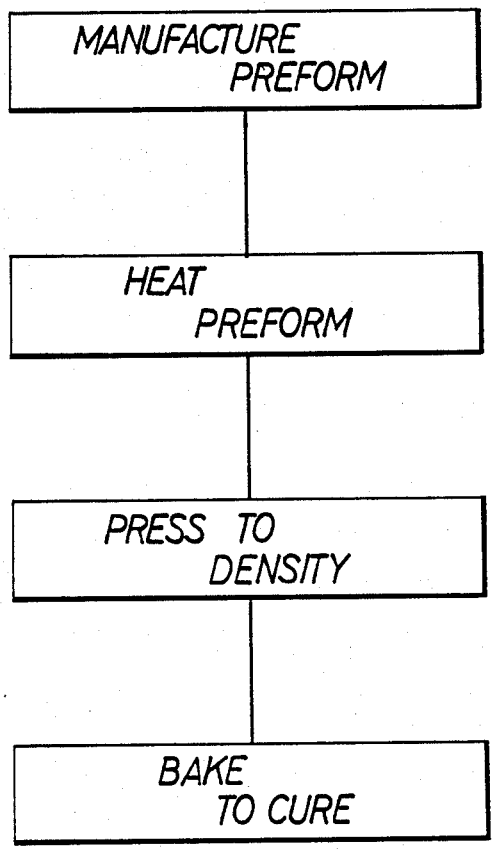

The process consists of four essential steps as shown in FIG. 2, namely pre-form manufacture, pre-form heating, pressing to the required density without cure, curing under a holding pressure only.

Preform manufacture is preferably carried out by deposition from a slurry as mentioned above, followed by de-watering under pressure and drying. Readily handleable preforms may be produced in this manner and the reinforcing fibres all lie substantially in the plane of the preform. The reinforcing fibres in the composition used for this type of pre-form manufacture are chosen to be suitable to form a web to hold the other ingredients of the slurry and ensure that the latter are not lost with the water. KEVLAR pulp is one particularly useful fibre for this purpose.

In the pre-heating step the preform must be heated to a suitable temperature to cause melting or softening of the binder resin before the application of pressure. Preform temperature may be measured by means of a thin thermocouple probe inserted mid-way between the two faces of the preform. When pressing preforms containing a phenol formaldehyde binder resin with a melting point of 50°–53° C. and mixtures of aromatic polyamide fibres and glass fibres, we prefer to heat the preforms to temperatures in the range of 90° C. to 100° C. although temperatures outside this range may be used with suitable variations in pressing conditions. The performs may be heated in the pressing die but, at die temperatures of 90°–100° C., require relatively long heating periods to reach the die temperature and thus, in commercial operation, rates of production would be limited. For example, with a die temperature of 100° C. typical heating times of 5–7 minutes are required for preforms to make facings of 0.120–0.150 thickness. When heating preforms in the pressing die, the die should be gently closed so that its surfaces are in good contact with the preform but without exerting much pressure on it; the weight of the top force of the die usually being sufficient to ensure adequate thermal contact. We prefer to heat the preform outside the pressing die so that the production rate of pressed facings need only be controlled by the time required for consolidation and loading/unloading of the die and will be independent of the preform heating time. Several preforms may be separately heated so as to provide a continuous supply of preforms, each at the desired temperature, to suit the operating cycle of the consolidating press. The preforms may be heated by electromagnetic radiation eg radio frequency or microwave heating but we prefer to heat the preforms between relatively inexpensive heated metal platens. The platens may be heated by any convenient means, eg electric resistence heating, provided that the temperature of the platens can be accurately controlled. The platen temperatures employed may be as high as 200° C. but it is more preferable to use temperatures in the region of 150° C. to reduce the possibility of blistering the products. The platens must exert sufficient pressure on the preform to ensure that it is flat so as to achieve uniform thermal contact between platens and preform. For this the platen weight may be sufficient in the case of small performs but a means of supplying extra clamping pressure may be necessary eg a pneumatically operated clamping cylinder. Typical times required to heat the preforms to a temperature of 90° C. are from 1 to 3 minutes for preforms to produce facings of 0.120" to 0.150" finished thickness.

Once the preform has been heated sufficiently it is pressed with sufficient pressure to consolidate to the desired proportion of the theoretical density ie 72 to 90 percent. Typically pressures of between 0.1 to 5 tons per square inch of die area are required for the necessary consolidation depending upon preform formulation, preform temperature and degree of consolidation required. After the desired consolidation pressure has been attained on the preform the preform is preferably maintained at that pressure for a short fixed period of typically 5 seconds to aid consistent consolidation care being taken to make sure that the conditions are insufficient to cure the preform. The hot and still soft product is then removed from the die and allowed to cool between flat surfaces under weights to ensure that it remains flat. The pressing die may be cold but is preferably maintained at a similar temmperature to that of the hot preform to minimise adhesion between the preform and the die. The die may also be smeared with a thin layer of a suitable release agent, such as low molecular weight polyethylene dispersed in water, to avoid sticking. Clearances between the fixed and moving parts of the pressing die should be kept to the minimum consistent with avoiding excessive "flashing" and ensuring the parts of the die do not bind together. We have found clearances of 0.003" to 0.005" to be satisfactory for the clearances between the diameters of the metal parts of pressing dies designed to produce annular shaped clutch facings of 7" to 10" outside diameter.

Curing of the now consolidated product is undertaken under conditions which will retain the product in its correct shape but will not cause further substantial change in degree of consolidation. Thus the consolidated products are preferably clamped in a suitable fixture between flat surfaces and heated to a temperature of 150° C. to 250° C. to complete the cure of the binder resin and to improve the friction and wear properties, a typical baking period being four hours at a temperature of 200° C. The facings may be coated with a release agent such as powdered talc to prevent the facings sticking together when stacked in a file in the baking fixture or individual facings may be separated by non-adherent layers such as thin woven glass cloth coated with polytetrafluoroethylene. The end plates of the baking fixture must be flat to prevent distortion of the facings during baking. Individual facings are preferably separated by flat metal plates to keep the baked facings as flat as possible. The facings are then ground and machined to the desired finished dimensions.

In the process trials clutch facing preforms comprising approximately 25% by weight of phenol-formaldehyde resin 15% by weight of an aromatic polyamide fibre pulp and 20% by weight of processed mineral wool fibres were heated to a temperature of 90° C. and then consolidated to produce facings with densities in the range of 80% to 86% of theoretical density ie with void volumes of 20% to 14%. Such facings when cured had high bursting strengths and showed excellent resistance to fade when tested on a dynamometer. It is to be noted that the balance of the materials in the facings was composed of a mixture of fillers and friction and wear modifiers.

The facings were permeable to air when tested under a differential pressure of 1atmosphere by applying the higher pressure to one side of a facing and checking for pressure rise on the opposite side of the facing caused by passage of air through the facing.

A rate of passage of air through the facing need not be great to indicate permeabilty; for example 1 to 5 ml of air per minute over a small area of facing is indicative that the voids are interconnected within the facing.

The test of air permeability mentioned above is simply one of several which are available, so that, for example, if the facing is attached to an impermeable backing there is a test available which checks for permeability between two areas of the same surface of the facing.

We claim:

1. A non-asbestos clutch facing comprising reinforcing fibres embedded in a matrix of binder material in which the actual density of the facing is in the range of 72% to 90% of theoretical density such that the facing is permeable to air, under a pressure differential of 1 atmosphere, and the amount of reinforcement fibres in the facing is between 4 and 60 percent by weight.

2. A facing according to claim 1 in which the reinforcing fibres are staple fibres and the facing is a moulded facing having an actual density not greater than 90% of its theoretical density.

3. A facing according to claim 2 in which the reinforcing fibres have a length in the range 1 mm to 10 mm.

4. A facing according to claim 1 in which the reinforcing fibres are used in an amount of between 10 and 50 percent by weight of the facing.

5. A facing according to claim 2 in which the reinforcing fibres are of a material selected from glass, mineral wool, processed mineral fibre, alumino-silicates, basalt, metals, cellulose, aromatic polyamides, polyacrylonitrile, polyvinyl alcohol and polytetrafluoroethylene.

6. A facing according to claim 1 in which the binder material is based on rubber or resin or mixtures thereof.

7. A method for the manufacture of a non-asbestos clutch facing which comprises the steps of:
   (1) mixing curable binder material, reinforcing fibers to provide an amount of reinforcement fibers in the facing between 4 and 60 percent by weight, and optionally, friction and wear modifiers,
   (2) forming a preform comprising said mixture in the rough shape of a clutch facing,
   (3) heating and pressing said preform to compress it without substantially curing the binder material and consolidate the preform to an actual density where the facing product is permeable to air under a pressure differential of 1 atmosphere, and
   (4) completing cure of the binder by heating under conditions of pressure such as to not cause any substantial further change in actual density.

8. A method according to claim 7 in which the preform is manufactured by deposition from a slurry of its ingredients followed by de-watering and drying.

9. A method according to claim 8 in which the preform is heated for consolidation by contact between hot platens.

10. A method according to claim 7 in which the preform is consolidated by pressing to an actual density in the range 72 to 90 percent of theoretical density.

11. A method according to claim 7 in which the preform is pressed in a die.

* * * * *